(12) United States Patent
Bangalore Srinivas et al.

(10) Patent No.: US 11,433,530 B2
(45) Date of Patent: Sep. 6, 2022

(54) MOBILE ROBOTIC MANIPULATOR WITH TELEPRESENCE SYSTEM

(71) Applicant: Tata Consultancy Services Limited, Mumbai (IN)

(72) Inventors: Venkatesh Prasad Bangalore Srinivas, Bangalore (IN); Rajasilpi Sureshkumar Presannakumari, Bangalore (IN); Pradeep Prabhakar Kamble, Bangalore (IN); Venkat Raju Chintalapalli Patta, Bangalore (IN); Balamuralidhar Purushothaman, Bangalore (IN); Sreehari Kumar Bhogineni, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 25 days.

(21) Appl. No.: 17/206,426

(22) Filed: Mar. 19, 2021

(65) Prior Publication Data
US 2022/0184797 A1    Jun. 16, 2022

(30) Foreign Application Priority Data

Dec. 16, 2020 (IN) .............................. 202021054856

(51) Int. Cl.
*B25J 5/00* (2006.01)
*B25J 9/00* (2006.01)
(Continued)

(52) U.S. Cl.
CPC ............. *B25J 9/0009* (2013.01); *B25J 5/007* (2013.01); *B25J 9/109* (2013.01); *B25J 9/123* (2013.01);
(Continued)

(58) Field of Classification Search
CPC ... B25J 15/00; B25J 9/123; B25J 9/109; B25J 5/007; B25J 9/0009
See application file for complete search history.

(56) References Cited

U.S. PATENT DOCUMENTS 9,174,342 B2    11/2015    Pinter et al.
10,646,993 B1 *  5/2020   Wiley ........................ B25J 9/16
(Continued)

FOREIGN PATENT DOCUMENTS

CN    207827356 U  *  9/2018
CN    109774818 A  *  5/2019
(Continued)

*Primary Examiner* — Randell J Krug
(74) *Attorney, Agent, or Firm* — Finnegan, Henderson, Farabow, Garrett & Dunner LLP

(57) ABSTRACT

This disclosure relates generally to a mobile robotic manipulator with telepresence system which includes a chassis assembly, a tilting arm assembly, and a rotary gripper assembly. The chassis assembly includes a chassis plate which mounts plurality of drive motors coupled with plurality of omni wheels through plurality of L mounting brackets; plurality of anti-toppling arms includes a plurality of linear guides which is mounted on a C mount plate; and plurality of linear actuators is mounted to expand or retract the plurality of anti-toppling arms. The tilting arm assembly includes a bottom fixed end of a front long actuator is mounted to a large rotating plate through plurality of C clamps. The rotary gripper assembly includes a top plate of a gripper is mounted and separated by gap with a bottom plate of the gripper to place a gripper actuator on top surface of the bottom plate of the gripper.

15 Claims, 12 Drawing Sheets

(51) Int. Cl.
*B25J 9/10* (2006.01)
*B25J 9/12* (2006.01)
*B25J 9/16* (2006.01)
*B25J 15/00* (2006.01)

(52) U.S. Cl.
CPC ............ *B25J 9/126* (2013.01); *B25J 9/1689* (2013.01); *B25J 15/0028* (2013.01)

(56) References Cited

U.S. PATENT DOCUMENTS

| | | | |
|---|---|---|---|
| 2017/0221383 A1* | 8/2017 | Karol | H02K 5/00 |
| 2019/0302810 A1* | 10/2019 | Kibler | B25J 15/0019 |
| 2020/0009738 A1 | 1/2020 | Sutherland et al. | |
| 2020/0376671 A1* | 12/2020 | Taylor | B60B 29/006 |

FOREIGN PATENT DOCUMENTS

| | | | |
|---|---|---|---|
| CN | 209682173 U | * | 11/2019 |
| WO | WO 2014/006674 A1 | | 1/2014 |

\* cited by examiner

MOBILE ROBOTIC MANIPULATOR WITH TELEPRESENCE SYSTEM

PRIORITY CLAIM

This U.S. patent application claims priority under 35 U.S.C. § 119 to: India Application No. 202021054856, filed on Dec. 16, 2020. The entire contents of the aforementioned application are incorporated herein by reference.

TECHNICAL FIELD

This disclosure relates generally to a robotics system, and, more particularly, to a mobile robotic manipulator with telepresence system with base platform and omni drive wheels to drive at a required direction.

BACKGROUND

In present scenario, a tele operated robot is a mobile robotic platform which has connectivity to external world via Wi-Fi and Internet, by which a remote user/operator can connect to the robot and control the same in realtime. Current robotic technology in the market mainly focused on the tele-presence application, where the user connects to the robot with live video stream and drives the robot to a desired position with manual/automated commands. There are different set of robots purely focused on a tele manipulations operations (pick and place tasks). A tele manipulator robots are heavy and not portable, and tele-presence robots are very light and portable. In all these technology there are semi-autonomous features by which the robot takes its own decisions based on the environment which the sensors are able to see. The remote operator may not have full visibility of the robot environment, and likely to collide, face difficulty while traversing from one destination to another destination, and lacks in controlling the tele-presence robots at a safety stop etc.

SUMMARY

Embodiments of the present disclosure present technological improvements as solutions to one or more of the above-mentioned technical problems recognized by the inventors in conventional systems. For example, in one embodiment, a mobile robotic manipulator with telepresence system is provided. The mobile robotic manipulator with telepresence system includes a chassis assembly, a tilting arm assembly, and a rotary gripper assembly. The chassis assembly includes a plurality of drive motors is mounted on a chassis plate; a plurality of anti-toppling arms includes a plurality of linear guides which is mounted on a C mount plate; and a plurality of linear actuators is mounted to expand or retract the plurality of anti-toppling arms. In an embodiment, the plurality of drive motors is coupled with a plurality of omni wheels through a plurality of L mounting brackets. In an embodiment, the C mount plate is mounted on top of the chassis plate. The tilting arm assembly includes a bottom fixed end of a front long actuator is mounted to a large rotating plate through one of a C clamp from a plurality of C clamps; and a bottom fixed end of a rear long actuator is mounted to the large rotating plate through one of the C clamp from the plurality of C clamps. In an embodiment, the tilting arm assembly is mounted in a horizontal plane to rotate the tilting arm assembly at a required angle. In an embodiment, the large rotating plate is mounted on the rotating plate. The rotary gripper assembly includes a top plate of a gripper is mounted and separated by a gap with a bottom plate of the gripper to place a gripper actuator on top surface of the bottom plate of the gripper; and a cam plate is connected to the rotary gripper assembly and mounted on bearing unit. In an embodiment, the bearing unit is mounted on top plate of the gripper.

In an embodiment, at least one sliding part of the at least one linear guide expands towards a front side and other sliding part of the at least one linear guide expands towards a rear side. In an embodiment, the plurality of linear guides retracted inside the chassis assembly when the plurality of anti-toppling arms are not in function. In an embodiment, a plurality of castors are fixed to a plurality of castor holders which is mounted to the end of sliding part of the at least one linear guide to touch and roll the plurality of castors. In an embodiment, a turntable assembly mounting plate is mounted at certain height from the chassis plate through a plurality of standoffs. In an embodiment, a bottom end of a turntable assembly is mounted to center of the turntable assembly mounting plate. In an embodiment, other movable top rod end of the front long actuator is mounted to one of a pivot point from a plurality of pivot points on the bottom plate of the gripper. In an embodiment, the other movable top rod end of the rear long actuator is mounted to one of the pivot point from the plurality of pivot points on the bottom plate of the gripper. In an embodiment, a hook arm is mounted on top side of the large rotating plate for a curved end of the hook arm to rotate about the other pivoted end to a desired angle.

In an embodiment, a fixed end of the gripper is mounted to the bottom plate of the gripper and a rod expanding end to a cam pin of the cam plate. In an embodiment, the cam pin of the cam plate is connected to rod end of the gripper actuator. In an embodiment, the gripper actuator actuates which causes a rotary motion to a gripper housing which is mounted to swivel on top of the top plate of the gripper. In an embodiment, one end of a spherical joint is connected to a U plate. In an embodiment, a gripper rotary motor is mounted on the U plate. In an embodiment, the gripper rotary motor rotates the rotary gripper assembly about an axis of the gripper rotary motor of the mobile robotic telepresence system. In an embodiment, the rotary gripper assembly include (a) a gripper linear motor mounted on to a support plate, and (b) a screw nut which is mounted on to the gripper linear motor. In an embodiment, the screw nut includes a plurality of ends. In an embodiment, the plurality of ends is connected by a single finger clamp and a double finger clamp. In an embodiment, the single finger clamp and the double finger clamp are mounted on a clamp holding pin. In an embodiment, the clamp holding pin is mounted in between other flanges of the support plate. In an embodiment, the gripper linear motor rotates the single finger clamp and the double finger clamp which is pivoted about the clamp holding pin to open or close as the screw nut moves forward and backward direction by the gripper linear motor.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1A:
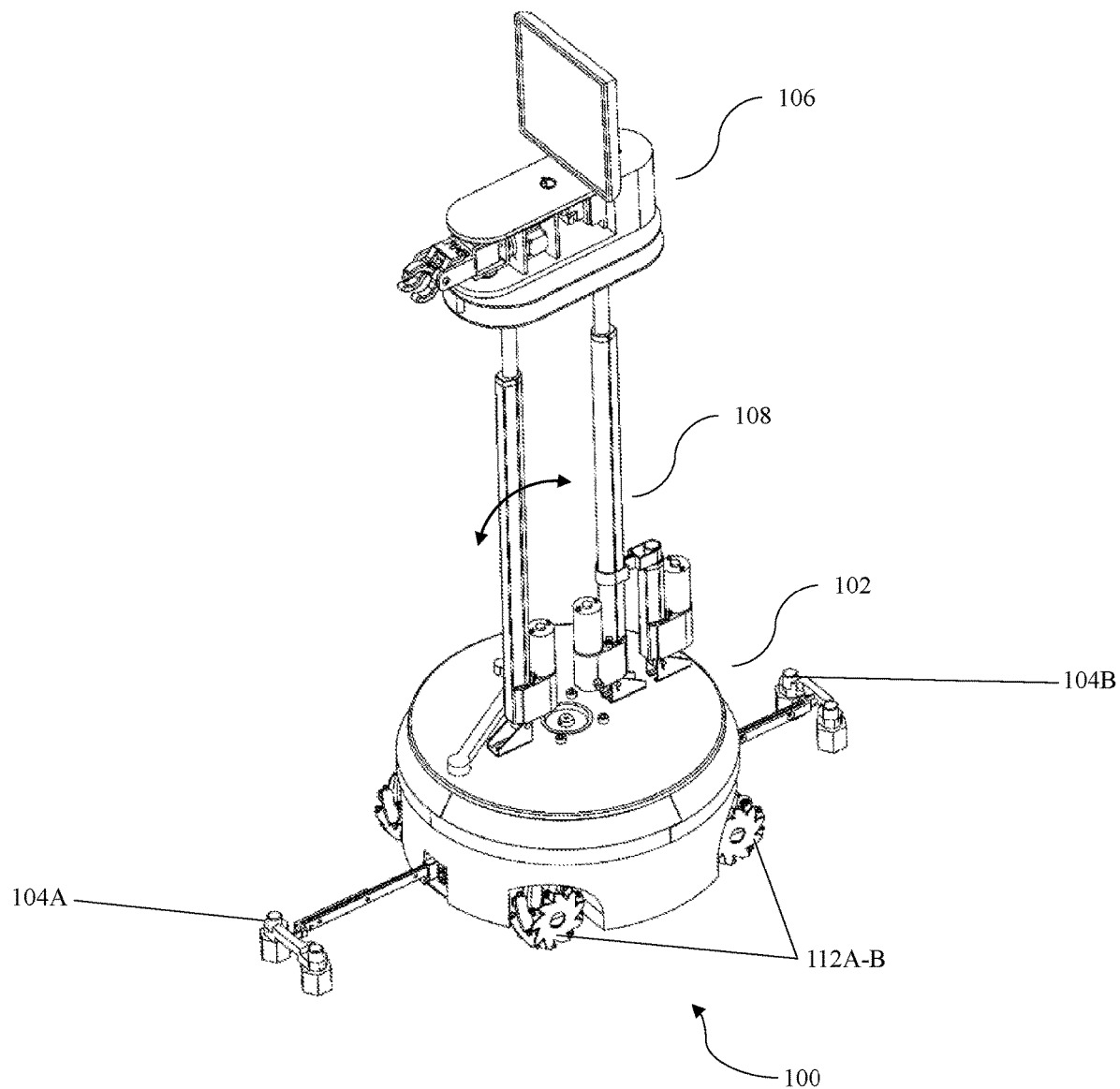
FIG. 1A and FIG. 1B are isometric views depicting a mobile robotic manipulator with telepresence system, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Embodiments of the present disclosure provide a mobile robotic manipulator with telepresence system includes a base platform consisting of four omni drive wheels to drive entire robot through any required direction as programmed. The mobile robotic manipulator with telepresence system also consists of a gripper with a video display, a tilting arm assembly, a plurality of anti-toppling arms, and a door locking mechanism which is optional. The primary task of the gripper may be handling a door (e.g., opening and closing of the door) and the gripper can also hold one or more mobile devices like a pen, teacup, marker etc. The tilting arm assembly supports the gripper to tilt at a required angle as required to open the door or to adjust a height during audio/video conferencing. A rotary base plate, along with the tilting arm assembly, provides flexibility to the mobile robotic manipulator with telepresence system to adjust accordingly to open the door or to address one or more users in a conferencing room as the users are speaking during audio/video call. The mobile robotic manipulator with telepresence system can achieve a required position with a help of both rotary and tilting movement. The plurality of anti-toppling arms acts consequently when the door opening happens, which cancels out unbalanced moments in the mobile robotic manipulator with telepresence system. The door locking mechanism is designed to hold the door at the required position when the robot is crossing the door from one side to another.

Referring now to the drawings, and more particularly to FIG. 1 through FIG. 7B, where similar reference characters denote corresponding features consistently throughout the figures, there are shown preferred embodiments and these embodiments are described in the context of the following exemplary system and/or method.

Reference numerals of one or more components of the mobile robotic manipulator with telepresence system, as depicted in the FIG. 1 through FIG. 7B are provided in Table 1 below for ease of description.

TABLE 1

| S.NO | NAME OF COMPONENT | REFERENCE NUMERALS |
|---|---|---|
| 1 | Mobile robotic manipulator with telepresence system | 100 |
| 2 | Chassis assembly | 102 |
| 3 | Plurality of anti-toppling arms | 104A-B |
| 4 | Rotary Gripper assembly | 106 |
| 5 | Tilting arm assembly | 108 |
| 6 | Gripper to Clamp and De-clamp | 110 |
| 7 | Plurality of omni wheels | 112A-N |
| 8 | Plurality of pivot points | 202A-B |
| 9 | Front long actuator | 204 |
| 10 | Rear long actuator | 206 |
| 11 | Actuator connector link | 208 |
| 12 | Short actuator | 210 |
| 13 | Rotating plate | 212 |
| 14 | Actuator pin | 214 |
| 15 | Hook arm | 216 |
| 16 | Plurality of C clamps | 218A-C |
| 17 | Chassis plate | 302 |
| 18 | Plurality of linear actuators | 304A-B |
| 19 | C mount plate | 306 |
| 20 | Plurality of standoffs | 308A-N |
| 21 | Plurality of drive motors | 310A-D |
| 22 | Turntable assembly | 312 |
| 23 | Turntable assembly mounting plate | 314 |
| 24 | Plurality of L mounting brackets | 316A-D |
| 25 | Plurality of castors | 318A-D |
| 26 | Plurality of castor holders | 320A-B |
| 27 | Plurality of linear guides | 322A-B |
| 28 | Plurality of linear guide holders | 324A-B |
| 29 | Circular outer cover | 326 |
| 30 | Circular outer enclosure | 328 |
| 31 | Rotary table motor | 402 |
| 32 | Large rotating plate | 404 |
| 33 | Cam plate | 502 |
| 34 | Cam pin | 504 |
| 35 | Gripper actuator | 506 |
| 36 | Sphere holder | 508 |
| 37 | Spherical joint | 510 |
| 38 | Ball plunger | 512 |
| 39 | Display rod | 514 |
| 40 | Display holder | 516 |
| 41 | Clamp Holding pin | 518 |
| 42 | Support plate | 520 |
| 43 | Gripper linear motor | 522 |
| 44 | Gripper rotary motor | 524 |
| 45 | Top plate of the Gripper | 526 |
| 46 | Bottom plate of the Gripper | 528 |
| 47 | U plate | 530 |
| 48 | Three finger clamp | 532 |
| 49 | Gripper housing | 534 |
| 50 | Display | 536 |
| 51 | Double finger clamp | 602 |
| 52 | Screw nut | 604 |
| 53 | Single finger clamp | 606 |
| 54 | Male door clip holder | 702 |
| 55 | Female door clip | 704 |
| 56 | String holder | 706 |
| 57 | String and spring mechanism holder | 708 |

TABLE 1-continued

| S.NO | NAME OF COMPONENT | REFERENCE NUMERALS |
|------|-------------------|--------------------|
| 58 | Plurality of guide rods | 710A-B |
| 59 | Door lock mechanism unit | 712 |
| 60 | Mini actuator | 714 |
| 61 | Door lock mounting plate | 716 |
| 62 | String | 718 |

Figure 1B:
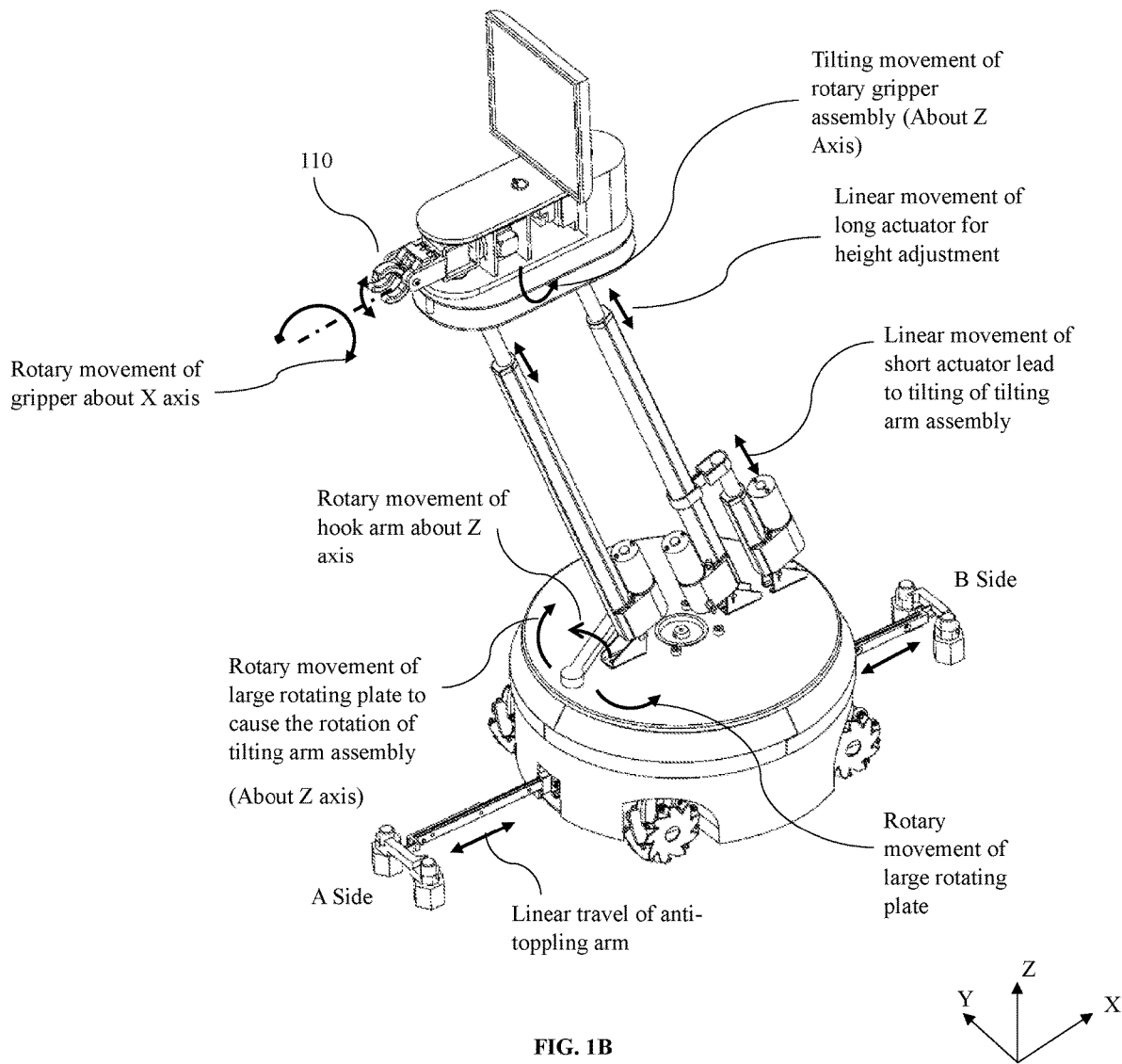
Figure 2A:
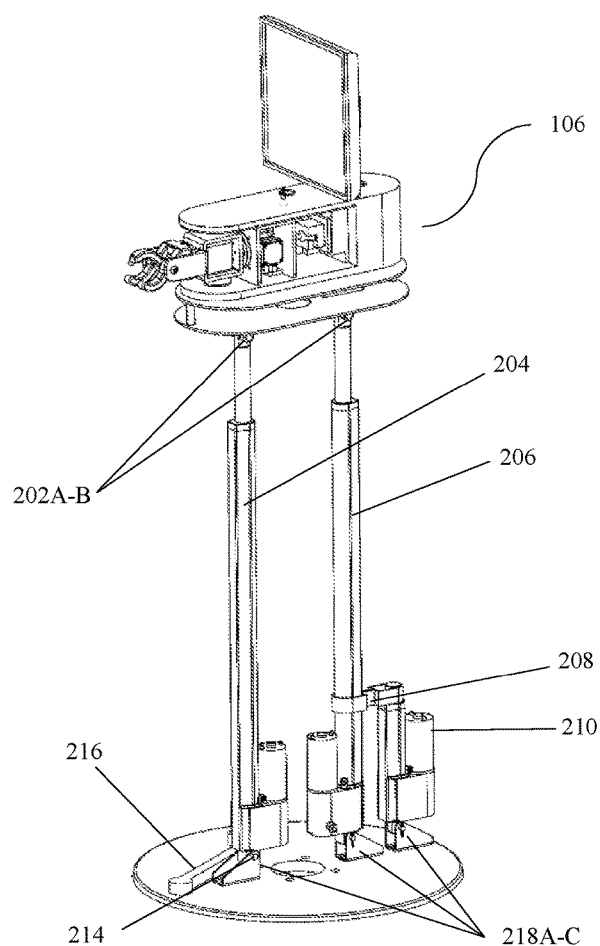
FIG. 2A and FIG. 2B are isometric views depicting working mechanism of a tilting arm assembly of the mobile robotic manipulator with telepresence system, according to some embodiments of the present disclosure.
Figure 2B:
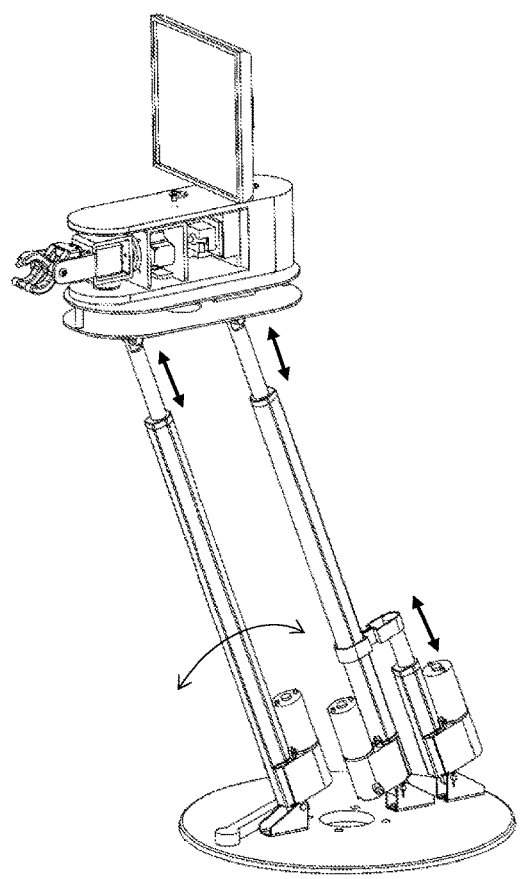

FIG. 1A and FIG. 1B are isometric views depicting the mobile robotic manipulator with telepresence system 100, according to some embodiments of the present disclosure. FIG. 2A and FIG. 2B are isometric views depicting working mechanism of the tilting arm assembly 108 of the mobile robotic manipulator with telepresence system 100, according to some embodiments of the present disclosure. The mobile robotic manipulator with telepresence system 100 includes a base platform includes a plurality of omni drive wheels (e.g., four omni drive wheels) 112A-N to drive the mobile robotic manipulator with telepresence system 100 through any required direction as programmed. The mobile robotic manipulator with telepresence system 100 also consists of the gripper 110 with the display 536 (as depicted in FIG. 5B), the tilting arm assembly 108, the plurality of anti-toppling arms 104A-B, and a door locking mechanism which is optional. In an embodiment, the gripper 110 holds knob of a door to open a closed door. In another embodiment, the gripper 110 can also hold but not limited to one or more mobile devices like a pen, a marker, and a teacup etc. The tilting arm assembly 108 supports the gripper 110 to tilt at a required angle as required to open the door or to adjust a height during audio/video conferencing.

In an embodiment, a rotating plate 212, along with the tilting arm assembly 108 provides flexibility to the mobile robotic manipulator with telepresence system 100 to adjust by opening the door and to address one or more users in a conferencing room. The mobile robotic manipulator with telepresence system 100 achieves a required position by a rotary and a tilting movement of the mobile robotic manipulator with telepresence system 100. The at least one anti-toppling arm 104A acts subsequently when the door opening happens if required, which cancels out unbalanced moments in the mobile robotic manipulator with telepresence system 100. In an embodiment, the door locking mechanism is designed to hold the door at the required position when the mobile robotic manipulator with telepresence system 100 is crossing the door from one side to another.

Figure 3A:
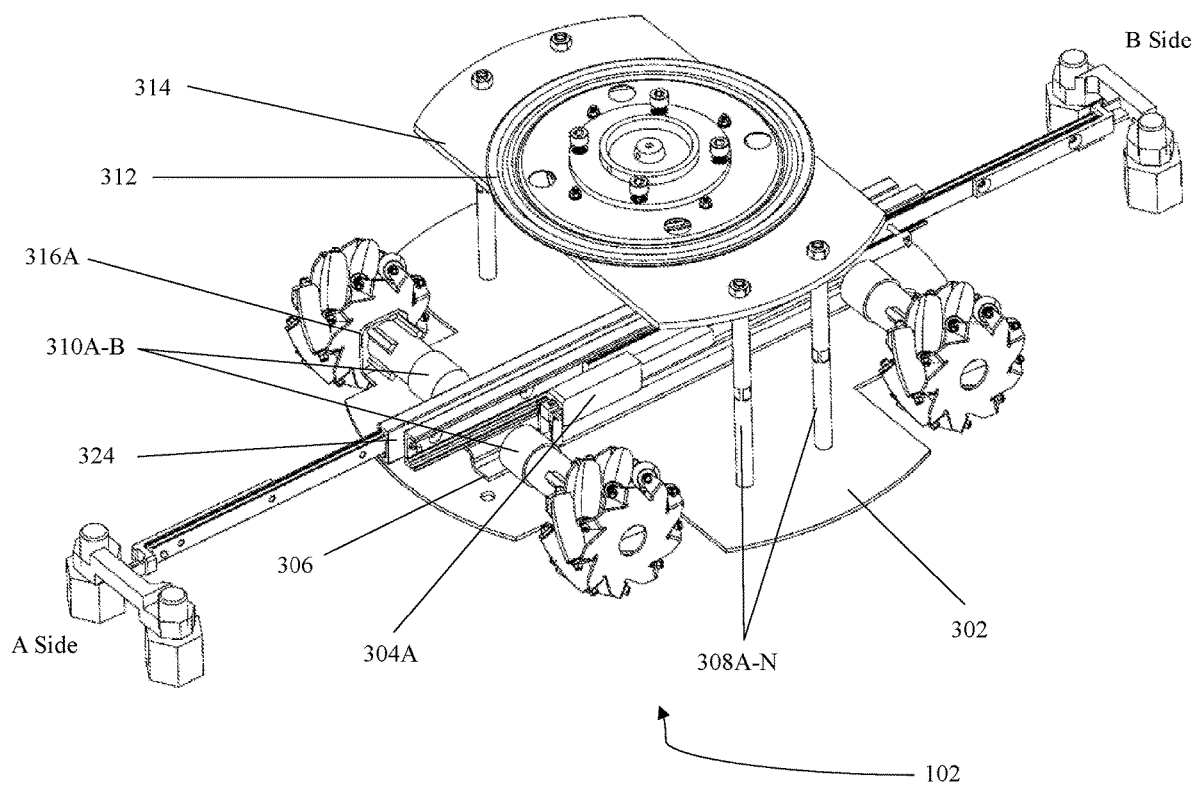
FIG. 3A and FIG. 3B are isometric views depicting a chassis assembly of the mobile robotic manipulator with telepresence system, according to some embodiments of the present disclosure.
Figure 3B:
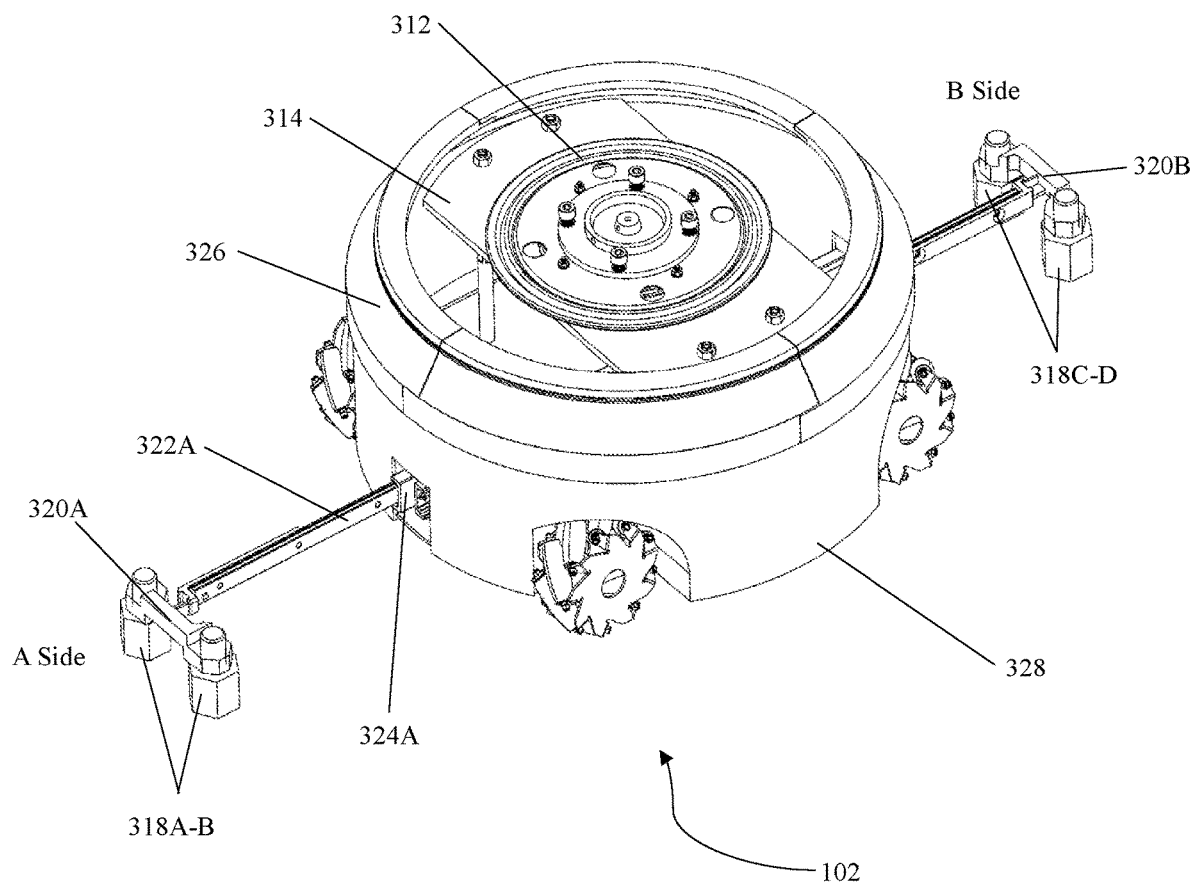
Figure 4:
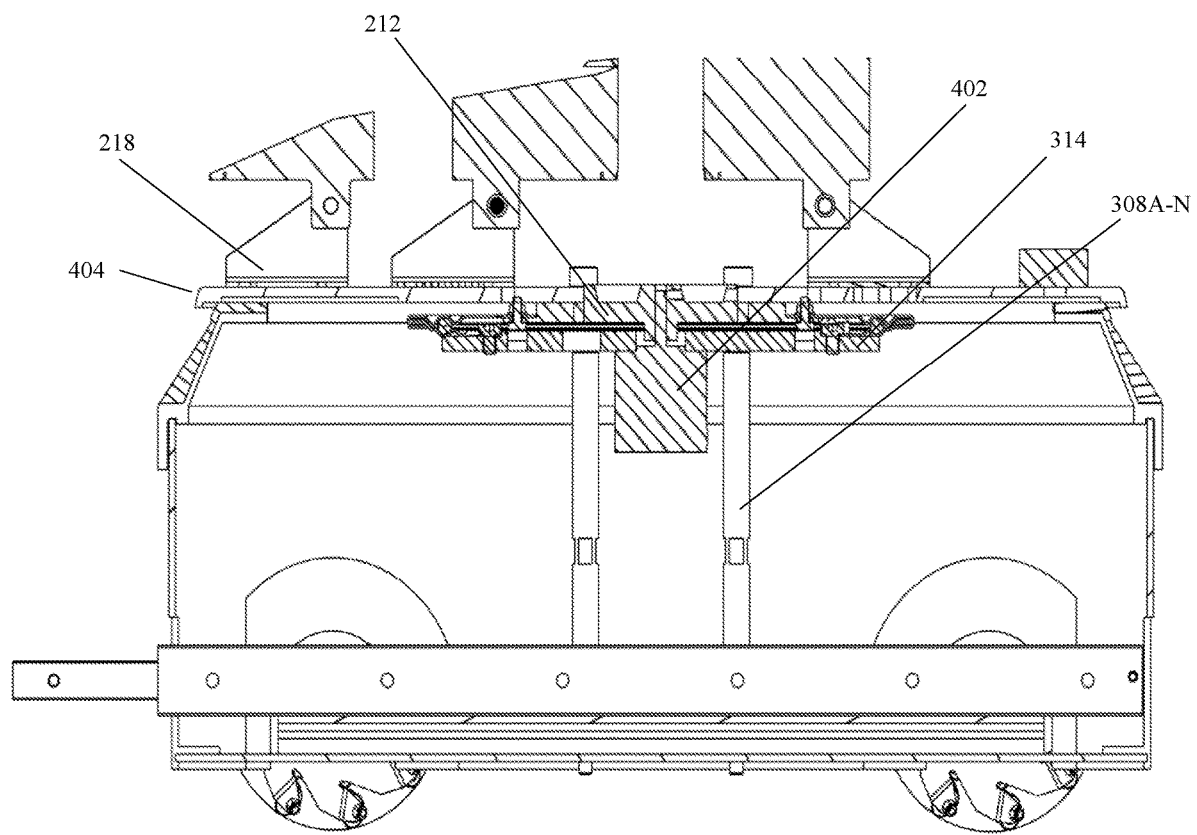
FIG. 4 is a sectional view depicting the chassis assembly of the mobile robotic manipulator with telepresence system, according to some embodiments of the present disclosure.

FIG. 3A and FIG. 3B are isometric views depicting the chassis assembly 102 of the mobile robotic manipulator with telepresence system 100, according to some embodiments of the present disclosure. FIG. 4 is a sectional view depicting the chassis assembly 102 of the mobile robotic manipulator with telepresence system 100, according to some embodiments of the present disclosure. The chassis assembly 102 includes the chassis plate 302 on which the four omni wheels 112A-D are attached and driven by a plurality of drive motors (e.g., four drive motors 310A-D) 310A-D mounted to the chassis plate 302. In an embodiment, the plurality of drive motors 310A-D is coupled with the plurality of omni wheels 112A-N through the plurality of L mounting brackets 316A-N. The four drive motors 310A-D are screwed to corresponding four bends of the chassis plate 302. The four drive motors 310A-D directly connected to the four omni wheels 112A-D, which can move any direction as programmed. In an embodiment, any direction corresponds to but not limited to left side, right side, front side, rear side, diagonal side without taking a turn and can also rotate about corresponding axis. The plurality of anti-toppling arms 104A-B are mounted to the chassis plate 302 by a C mount plate 306. The C mount plate 306 is mounted on top of the chassis plate 302. The plurality of anti-toppling arms 104A-B include the plurality of linear guides 322A-B and the plurality of linear guide holders 324A-B. In an embodiment, a series of balls and one or more retainers are placed in between the plurality of linear guides 322A-B and the plurality of linear guide holders 324A-B. In an embodiment, at least one sliding part of the at least one linear guide 322A expand towards a CA' side and other sliding part of the at least one linear guide 322B expand towards a CB' side. The plurality of linear guides 322A-B retracted inside the chassis assembly 102 when the plurality of anti-toppling arms 104A-B are not in function. In an embodiment, the CA' side and the CB' side may correspond to a front side and a rear side respectively or a vice versa.

The plurality of linear guides 322A are further connected to the plurality of linear actuators 304A. In an embodiment, one end of the at least one linear actuator 304A is connected to the chassis assembly 102, and another rod end of the at least one linear actuator 304A is connected to the plurality of linear guides 322A-B of the plurality of anti-toppling arms 104A-B. In an embodiment, one end of the plurality of anti-toppling arms 104A-B holds the plurality of castors 318A-D (e.g., two ball castors) by the plurality of castor holders (e.g., a ball castor holder) 320A-B. The plurality of anti-toppling arms 104A-B provide balance to the mobile robotic manipulator with telepresence system 100 during movement or while opening the door. In an embodiment, as the tilting arm assembly 108 tilts from a vertical direction, then the plurality of anti-toppling arms 104A-B are moved by the plurality of linear actuators 304A-B at the bottom to balance the mobile robotic manipulator with telepresence system 100. The plurality of anti-toppling arms 104A-B are provided in the design to support the mobile robotic manipulator with telepresence system 100 when there are unbalanced moments. The plurality of anti-toppling arms 104A-B are connected to the plurality of castors 318A-D at the end, which is continuously in contact with a ground. The plurality of castors 318A-D supports the mobile robotic manipulator with telepresence system 100 from a toppling effect. The plurality of anti-toppling arms 104A-B are provided at both front and rear sides of the mobile robotic manipulator with telepresence system 100 to gain more stability.

The plurality of castors 318A-D connects each anti-toppling arm 104A at one end. The plurality of castors 318A-D act as wheels at the end and provide stability. The plurality of anti-toppling arms 104A-B are in a retracted position and remained inside the mobile robotic manipulator with telepresence system 100 while not in use. In an embodiment, the plurality of linear actuators 304A-B is mounted to expand or retract the plurality of anti-toppling arms 104A-B. A circular outer cover 326 and a three dimensional (3D) printed outer covers are also screwed to the chassis plate 302 by one or more fasteners. In an embodiment, the three dimensional (3D) printed outer covers may be replaced with a single plastic cover or a sheet metal cover. The circular outer cover 326 is designed to protect one or more internal parts and improve aesthetics. The circular outer enclosure 328 of the chassis assembly 102 encloses one or more electronics control hardware and a battery (Not shown in FIG). The circular outer cover 326 mounts on top end of the circular outer enclosure 328 and rests by maintaining a gap below bottom side of the large rotating plate 404.

The chassis assembly 102 of the mobile robotic manipulator with telepresence system 100 includes the turntable assembly 312 on which the rotating plate 212 of the tilting arm assembly 108 is attached. In an embodiment, the turntable assembly 312 further consists of a rotary plate and a stationary plate. The stationary plate of the turntable assembly 312 mounted on a turntable assembly mounting plate 314. The stationary plate of the turntable assembly 312 is mounted inside the chassis assembly 102 by the plurality of standoffs 308A-N. The rotary plate of the turntable assembly 312 is mounted to the rotating plate 212 of the tilting arm assembly 108. The turntable assembly 312 is rotated by the rotary table motor 402. The turntable assembly mounting plate 314 is mounted at certain height from the chassis plate 302 through a plurality of standoffs 308A-N. A bottom end of a turntable assembly 312 is mounted to center of the turntable assembly mounting plate 314.

In an embodiment, the turntable assembly 312 inside the chassis assembly 102 on which the rotating plate 212 of the tilting arm assembly 108 is mounted. The tilting arm assembly 108 consists of at least one of: (i) the rotary gripper assembly 106, (ii) the rotating plate 212, (iii) a plurality of long actuators which are further referred as the front long actuator 204 and the rear long actuator 206, and (iv) the short actuator 210 pivoted at one or more points i.e., three points on the rotating plate 212 by the plurality of C clamps (e.g., three C clamps) 218A-C. In an embodiment, a bottom fixed end of the front long actuator 204 is mounted to the large rotating plate 404 through one of the C clamp 218A from the plurality of C clamps 218A-C. In an embodiment, a bottom fixed end of the rear long actuator 206 is mounted to the large rotating plate 404 through one of the C clamp 218A from the plurality of C clamps 218A-C. The function of the turntable assembly 312 is to rotate entire tilting arm assembly 108 to +/−90 degrees on a horizontal plane.

The front long actuator 204, the rear long actuator 206, and the short actuator 210 are mounted to the rotating plate 212 by the plurality of C clamps 218A-C and the actuator pin 214 at one or more hinge points. The actuator connector link 208 connects the front long actuator 204, the rear long actuator 206, and the short actuator 210. In an embodiment, one end of the actuator connector link 208 is connected to body of the rear long actuator 206. Similarly, another end of the actuator connector link 208 is connected to a rod end of the short actuator 210. In an exemplary embodiment, the short actuator 210 activates the tilting arm assembly 108 from a vertical direction to a certain degrees as required to adjust the height at a door handle. As the short actuator 210 retracts to a home position, the tilting arm assembly 108 tries to become vertical; once the short actuator 210 fully retracts, the tilting arm assembly 108 is perfectly vertical. As the short actuator 210 expands to full stroke, the tilting arm assembly 108 tilts to a maximum angle. The short actuator 210 adjusts the front long actuator 204 and the rear long actuator 206 to increase or decrease a desired height at a desired angle.

Figure 5A:
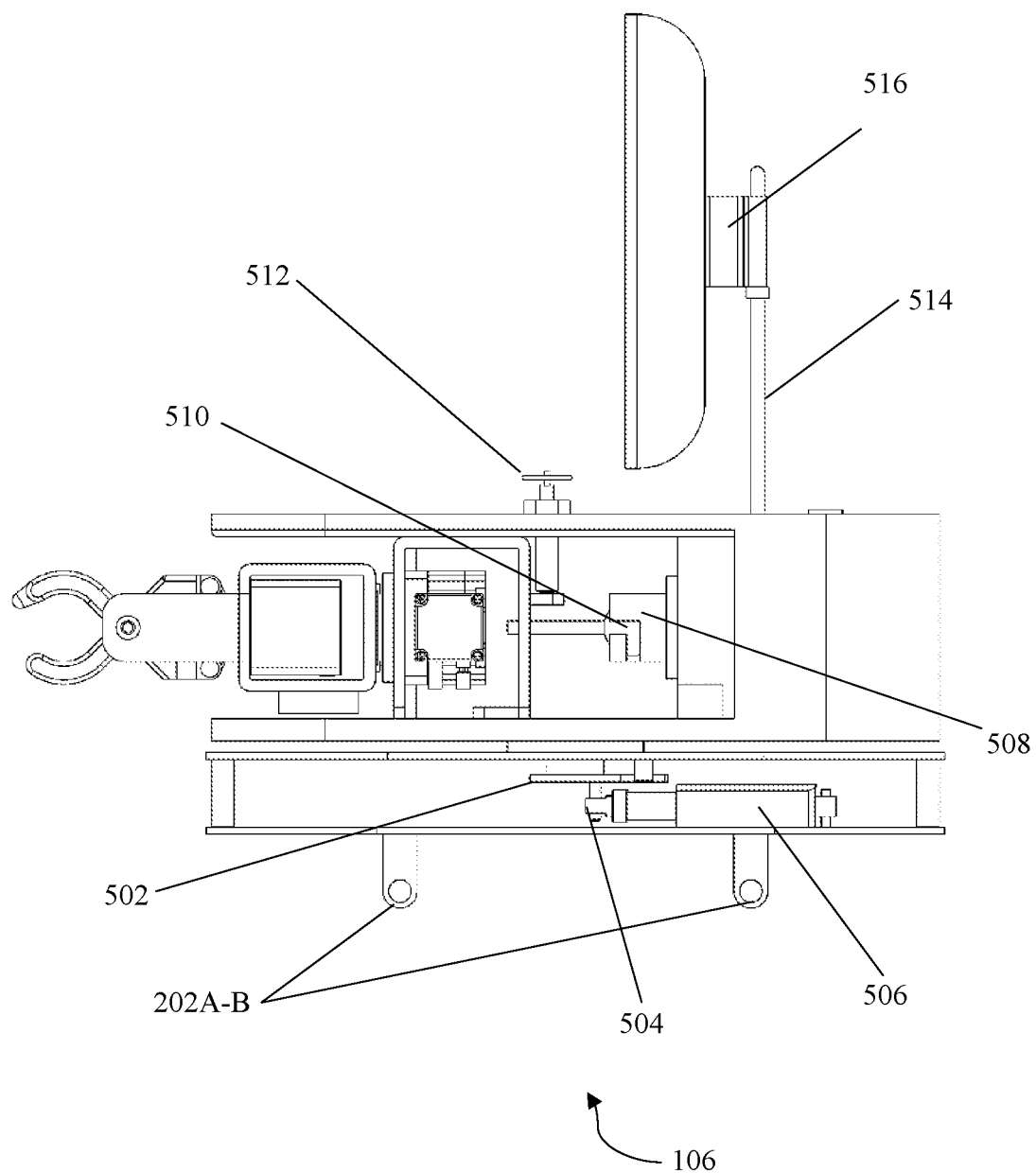
FIG. 5A-FIG. 5C are isometric views depicting a rotary gripper assembly of the mobile robotic manipulator with telepresence system, according to some embodiments of the present disclosure.
Figure 5B:
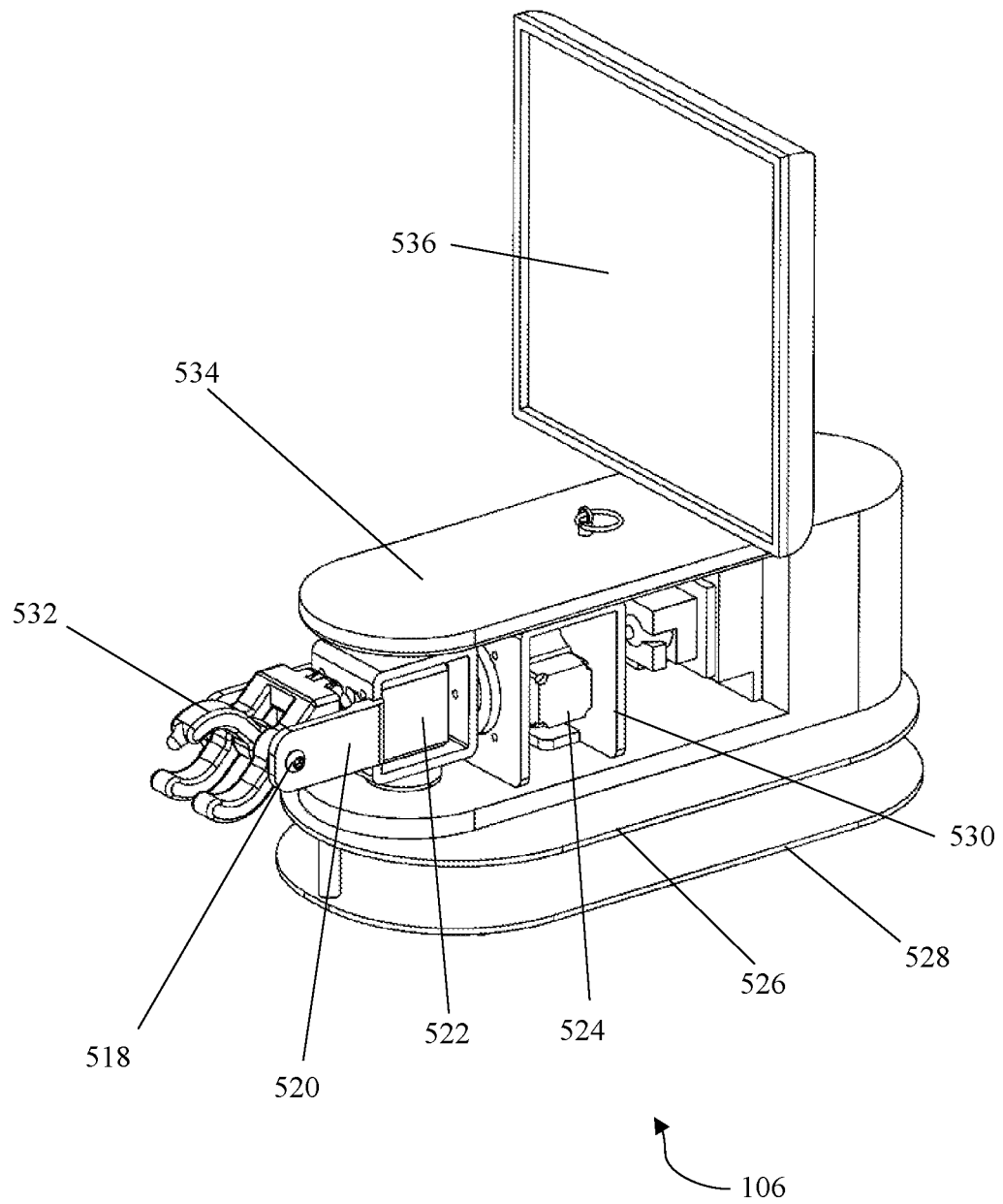
Figure 5C:
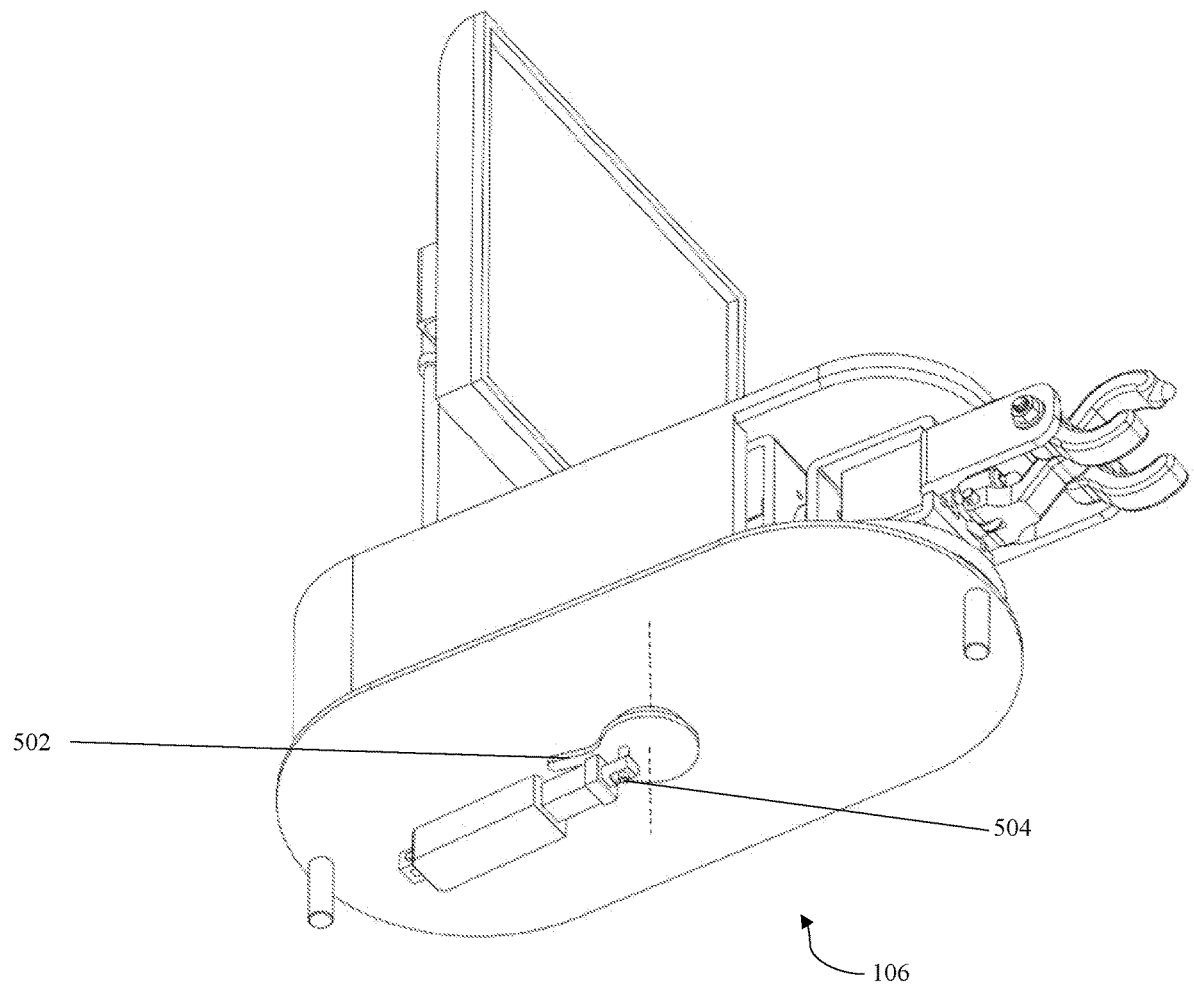
Figure 6:
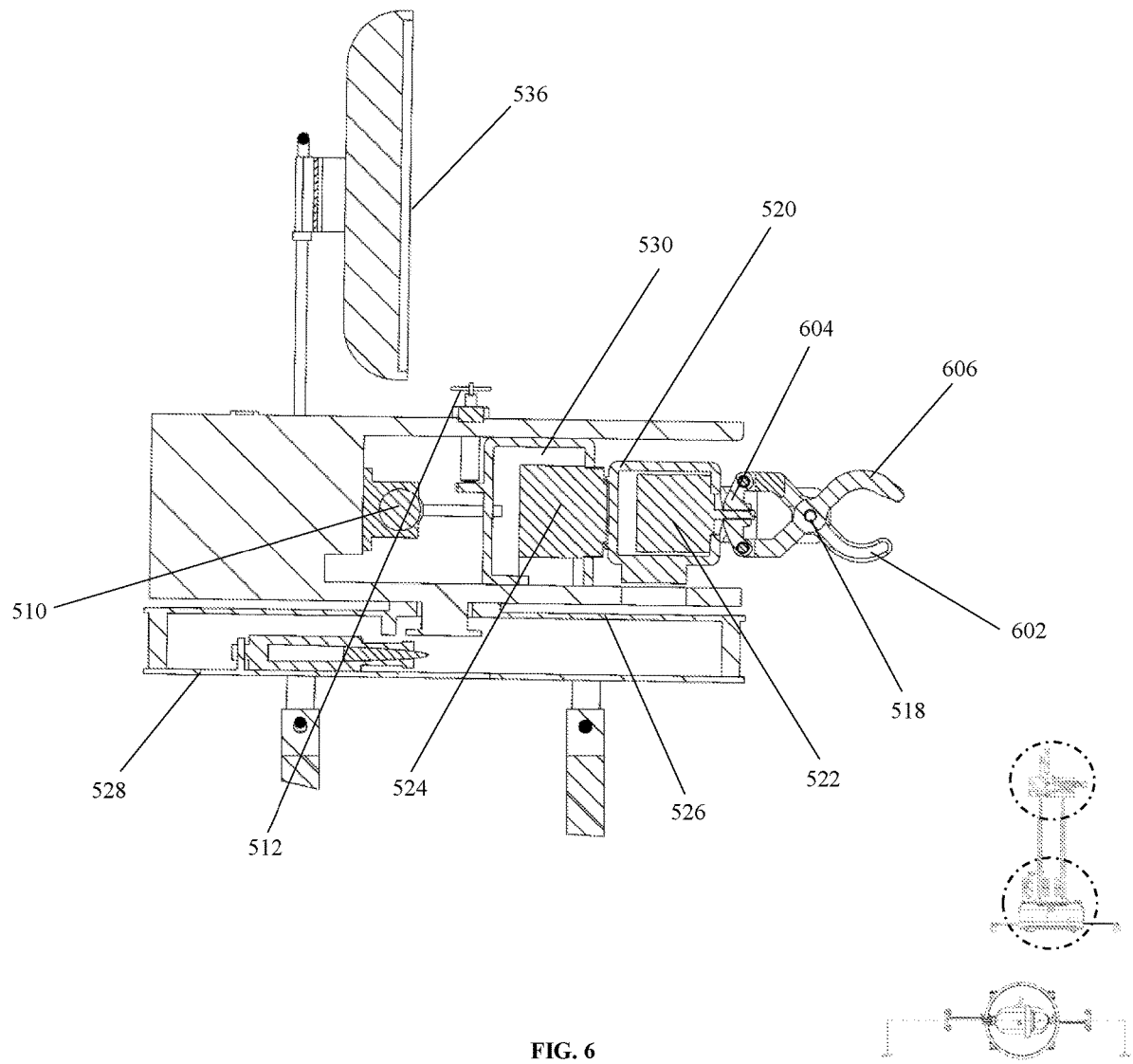
FIG. 6 is sectional view depicting the rotary gripper assembly of the mobile robotic manipulator with telepresence system, according to some embodiments of the present disclosure.

FIG. 5A-FIG. 5C are isometric views depicting the rotary gripper assembly 106 of the mobile robotic manipulator with telepresence system 100, according to some embodiments of the present disclosure. FIG. 6 is a sectional view depicting the rotary gripper assembly 106 of the mobile robotic manipulator with telepresence system 100, according to some embodiments of the present disclosure. The rotary gripper assembly 106 consists of the bottom plate 528 of the gripper 110 and the top plate 526 of the gripper 110. The bottom plate 528 of the gripper 110 is pivoted at two points of the front long actuator 204 and the rear long actuator 206.

The gripper actuator 506 is mounted in between the bottom plate 528 and the top plate 526 of the rotary gripper assembly 106. In an embodiment, one end of the gripper actuator 506 is pivoted at the bottom plate 528, and another end is connected to the cam plate 502. The cam plate 502 is further mounted to the gripper housing 534. The gripper housing 534 is mounted onto the top plate 526 of the gripper 110 by a bearing unit. In an embodiment, the pivot points align the rotary gripper assembly 106 horizontally by adjusting strokes of the front long actuator 204 and the rear long actuator 206.

The rotary gripper assembly 106 includes the top plate 526 of the gripper 110 is mounted and separated by a gap with the bottom plate 528 of the gripper 110 to place the gripper actuator 506 on top surface of the bottom plate 528 of the gripper 110; and the cam plate 502 is connected to the rotary gripper assembly 106 and mounted on bearing unit. The bearing unit is mounted on the top plate 526 of the gripper 110. A movable top rod end of the front long actuator 204 is mounted to one of a pivot point 202A from the plurality of pivot points 202A-B on the bottom plate 528 of the gripper 110. The other movable top rod end of the rear long actuator 206 is mounted to one of a pivot point 202B from the plurality of pivot points 202A-B on the bottom plate 528 of the gripper 110.

In an embodiment, total height of the mobile robotic manipulator with telepresence system 100 is controlled by one or more strokes of the front long actuator 204 and the rear long actuator 206 as required, and stroke of the short actuator 210 controls the tilting of the tilting arm assembly 108. In an embodiment, top face of the turntable assembly 312 which mounts on top of the rotary plate 212 whereby the rotary plate 212 is also able to revolve on a central axis. The large rotating plate 404 is also mounted on top of the rotary plate 212. The rotary plate 212 which includes an intermediatory connection between the large rotating plate 404 and top face of bearing is coupled with the rotary table motor 402. In an embodiment, when the rotary table motor 402 rotates, the large rotating plate 404 revolves on a motor axis, which is the central axis. For example, the large rotating plate 404 is designed to rotate plus or minus 180 degrees along with the tilting arm assembly 108. The hook arm 216 is mounted on top side of the large rotating plate 404 for a curved end of the hook arm 216 to rotate about another pivoted end to a desired angle.

In an exemplary embodiment, the tilting movement and the rotary movement of the tilting arm assembly 108 and the rotary gripper assembly 106 supports the mobile robotic manipulator with telepresence system 100 to: (a) open the door while entering the conference room etc, (b) adjust the robot's total height to locate the door handle or to locate a person during conferencing, and (c) address the speaker during audio/video conferencing. The gripper actuator 506 provides an additional tilting movement in the rotary gripper assembly 106 about a vertical axis. In an embodiment, the gripper actuator 506 actuates, the gripper housing 534 with the gripping unit spin about the bearing unit. The gripper rotary motor 524 provides a rotary movement to the gripping unit about a horizontal axis. In an embodiment, a fixed end of the gripper 110 is mounted to the bottom plate 528 of the gripper 110 and a rod expanding end to the cam pin 504 of the cam plate 502. In an embodiment, the cam pin 504 of the cam plate 502 is connected to rod end of the gripper actuator 506. The gripper actuator 506 actuates which causes a rotary motion to the gripper housing 534 which is mounted to swivel on top of the top plate 526 of the gripper 110.

A gripper linear motor assembly (not shown explicitly in FIG) includes the support plate 520, the gripper linear motor 522, the screw nut 604, the double finger clamp 602, and the single finger clamp 606. The gripper linear motor 522 (as depicted in FIG. 6B) rotates, the screw nut 604 moves forward or backward, thereby the single finger clamp 606 and the double finger clamp 602, which opens or closes about the pivot point, respectively. In an embodiment, the gripper linear motor 522 rotates the single finger clamp 606 and the double finger clamp 602 which is pivoted about the clamp holding pin 518 to open or close as the screw nut 604 moves forward and backward direction by the gripper linear motor 522. In an embodiment, the gripper housing 534 further includes the sphere holder 508 screwed, and the spherical joint 510 is coupled to the sphere holder 508. A rod end of the spherical joint 510 is connected to the U plate 530 of the rotary gripper assembly 106. The U plate 530 holds the gripper rotary motor 524 attached and rotates the gripper linear motor 522.

The spherical joint 510 supports to collapse the rotary gripper assembly 106 when not in use. In an embodiment, when the gripper 110 is in operation, a plunger of the ball plunger 512 rests into a hole of a flange of the U plate 530 to retain the rotary gripper assembly 106 at a stable position. The double finger clamp 602 and the single finger clamp 606 are connected to the screw nut 604 from two ends and pivoted at the clamp holding pin 518. The clamp holding pin 518 is fixed in between two flanges of the support plate 520. The screw nut 604 is screwed to a lead screw of the gripper linear motor 522. The ball plunger 512 of the gripper 110 is screwed to the gripper housing 534 from the top position. One end of the ball plunger 512 engages to the hole of the flange protruded from the U plate 530 when necessary. In an embodiment, the ball plunger 512 is to hold the rotary gripper assembly 106 in parallel to the display 536 when the gripper 110 is in operation, and the ball plunger 512 is disconnected from the U plate 530 when not in use. The display 536 of the mobile robotic manipulator with telepresence system 100 is mounted to the gripper housing 534 by using the display holder 516 and the display rod 514. In an embodiment, rotary movement of the mobile robotic manipulator with telepresence system 100 and tilting moment of the gripper 110 helps to address the people as they are talking during the conferencing. The function of the display 536 is to display presenter during the conferencing and also help as an input camera to a controller. In an embodiment, a door locking mechanism is attached at end of the plurality of anti-toppling arms 104A-B.

Figure 7A:
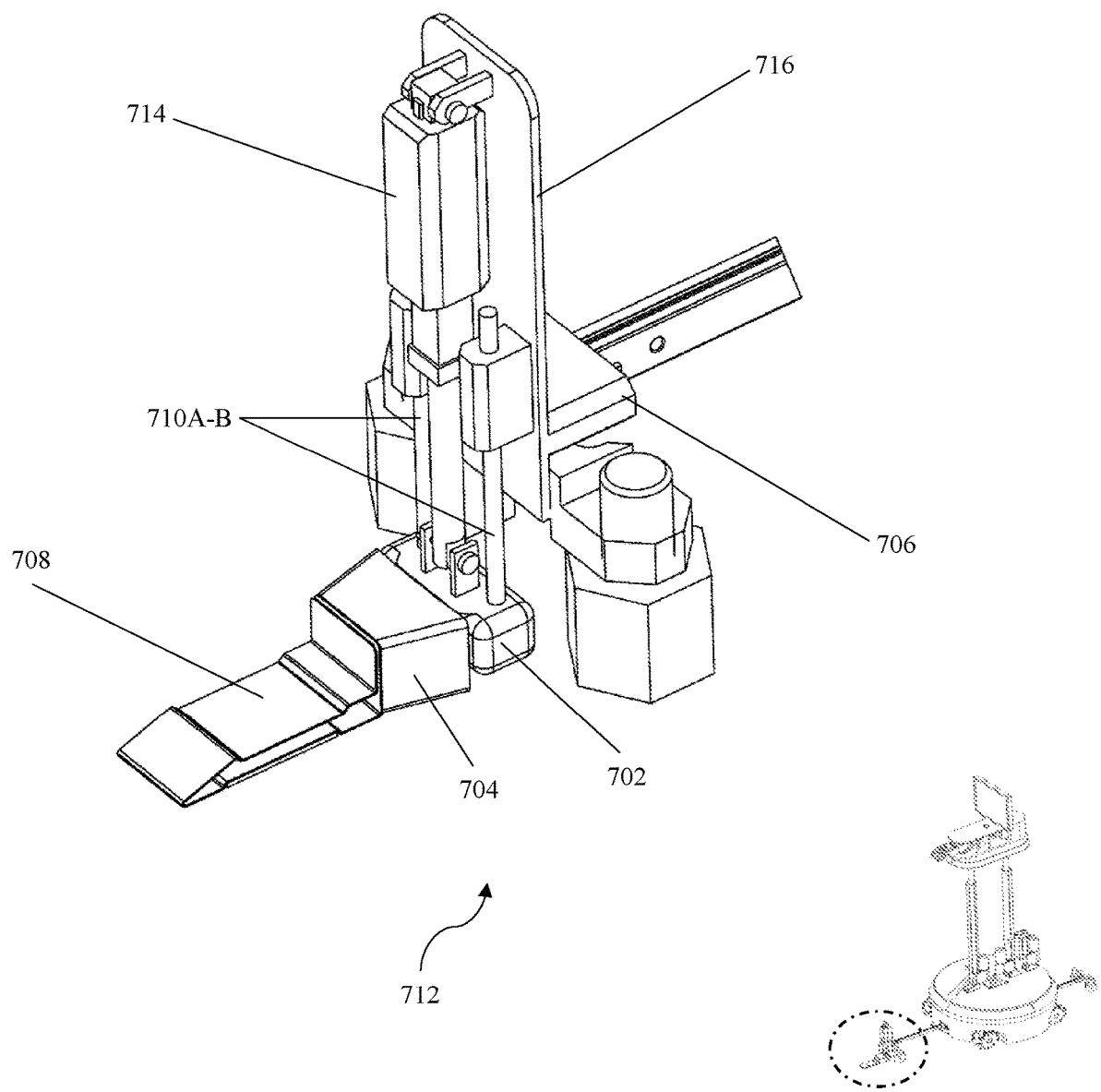
FIG. 7A-FIG. 7B are an exemplary isometric views depicting a door lock mechanism unit attached at end of an at least one anti-toppling arm of the mobile robotic manipulator with telepresence system to perform a door handling mechanism, according to some embodiments of the present disclosure.
Figure 7B:
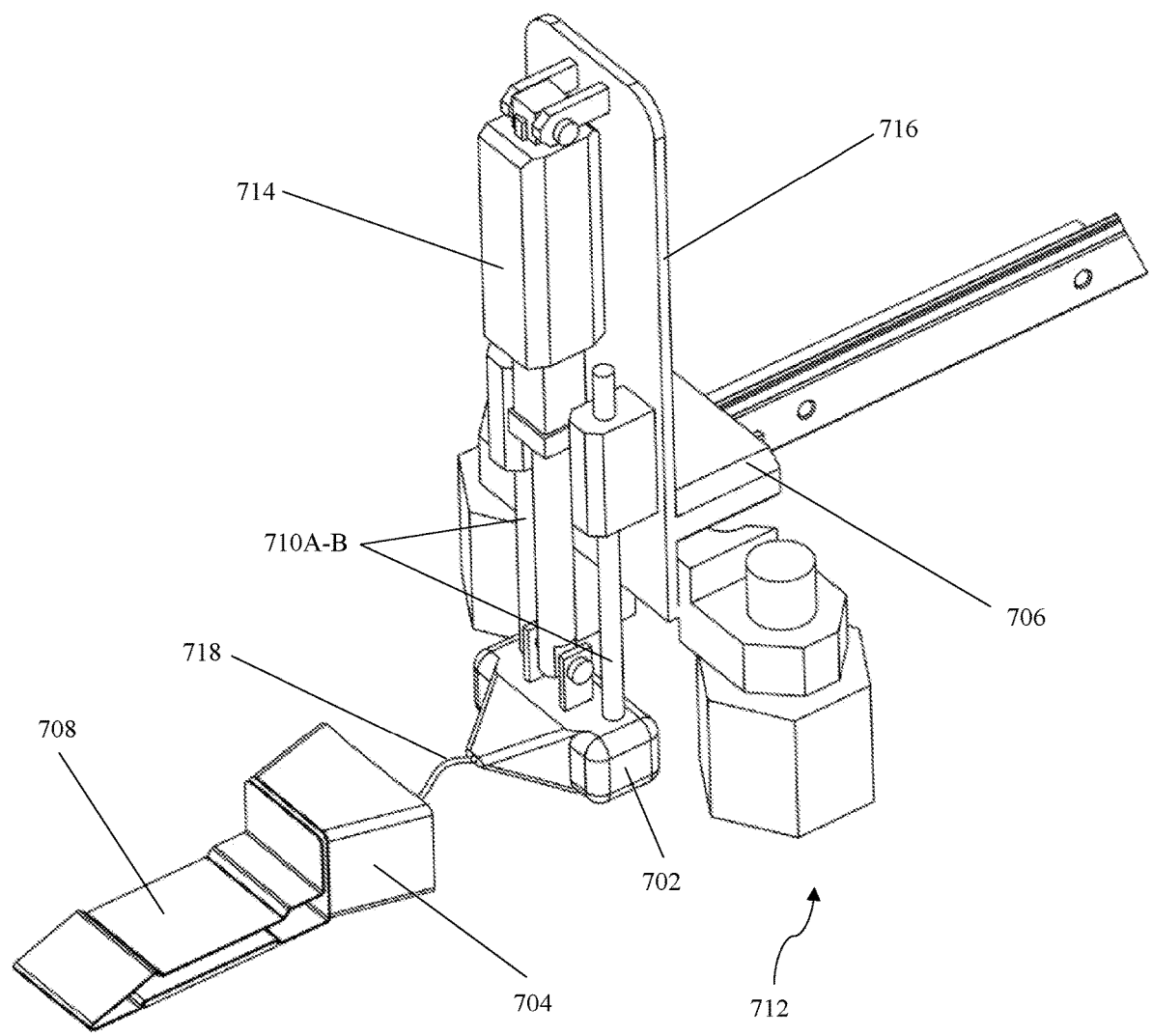

FIG. 7A-FIG. 7B are exemplary isometric views depicting the door lock mechanism unit 712 attached at end of the plurality of anti-toppling arms 104A-B of the mobile robotic manipulator with telepresence system 100 to perform a door handling mechanism, according to some embodiments of the present disclosure. In an embodiment, the door handling mechanism corresponds to a door opening or a door locking mechanism. The door lock mechanism unit 712 includes the male door clip holder 702, the female door clip 704, the string holder 706, the string and spring mechanism holder 708, the plurality of guide rods 710A-B, the mini actuator 714, the door lock mounting plate 716, and the string 718. The mini actuator 714 mounted on the plurality of anti-toppling arms 104A-B actuates the male door clip holder 702, the female door clip 704 at a downward direction. The plurality of anti-toppling arms 104A-B of the mobile robotic manipulator with telepresence system 100 inserts the string 718 from the string holder 706 and the sting and spring mechanism holder 708 underneath the door. The string and spring mechanism holder 708 along with the female door clip 704 remain underneath the door allowing the mobile robotic manipulator with telepresence system 100 to move other side of the door.

The string and spring mechanism holder 708 ensure whenever the female door clip 704 is pulled away from a home position to certain length of the string 718 exposed outside and then the male door clip holder 702 is released from the female door clip 704. The female door clip 704 automatically comes back to attach with the male door clip holder 702 when the mobile robotic manipulator with telepresence system 100 tries to move in forward direction from the door. In an embodiment, the string and spring mechanism holder 708 holds the door in position and remains with the door, since the string 718 is connected to the string and spring mechanism holder 708 as the mobile robotic manipulator with telepresence system 100 pass through other side of the door. In an embodiment, the mobile robotic manipulator with telepresence system 100 forward enough to the extent the length of the string 718 cannot extend beyond, then the door locking mechanism gets detached from the door and retract itself automatically to comeback to corresponding home position.

The embodiments of present disclosure thus provide the mobile robotic manipulator with telepresence system with different degrees of freedom and can do a variety of tasks like opening a door can be built. Making such a system, with lightweight, compact, without compromising for stability, is achieved through this design. The embodiments of present disclosure in which the plurality of linear guides and the plurality of linear guide holders of the mobile robotic manipulator with telepresence system are connected by series of balls and retainers which further delivers the frictionless movement between them.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A mobile robotic manipulator with a telepresence system (100), comprising:
   a chassis assembly (102), comprising:
      a plurality of drive motors (310A-D) mounted on a chassis plate (302), wherein the plurality of drive motors (310A-D) are coupled with a plurality of omni wheels (112A-N) through a plurality of L mounting brackets (316A-N), respectively;
      a plurality of anti-toppling arms (104A-B) comprising a plurality of linear guides (322A-B) which are mounted on a C mount plate (306), wherein the C mount plate (306) is mounted on top of the chassis plate (302); and
      a plurality of linear actuators (304A-B) are mounted to expand or retract the plurality of anti-toppling arms (104A-B);
   a tilting arm assembly (108), comprising:
      a bottom fixed end of a front actuator (204) mounted to a first rotating plate (404) through a first C clamp (218A) from a plurality of C clamps (218A-C), wherein the tilting arm assembly (108) is mounted in a horizontal plane to rotate the tilting arm assembly (108) at a required angle, wherein the first rotating plate (404) is mounted on a second rotating plate (212); and
      a bottom fixed end of a rear actuator (206) is mounted to the first rotating plate (404) through the first C clamp (218A); and
   a rotary gripper assembly (106), comprising:
      a top plate (526) of a gripper (110) mounted and separated by a gap with a bottom plate (528) of the gripper (110) to place a gripper actuator (506) on a top surface of the bottom plate (528) of the gripper (110); and
      a cam plate (502) connected to the rotary gripper assembly (106) and mounted on a bearing unit, wherein the bearing unit is mounted on the top plate (526) of the gripper (110).

2. The mobile robotic manipulator with the telepresence system (100) as claimed in claim 1, wherein at least one sliding part of the at least one linear guide (322A) expands towards a front side and another sliding part of the at least one linear guide (322B) expands towards a rear side, wherein the plurality of linear guides (322A-B) retract inside the chassis assembly (102) when the plurality of anti-toppling arms (104A-B) are not in function.

3. The mobile robotic manipulator with the telepresence system (100) as claimed in claim 1, wherein a plurality of castors (318A-D) is fixed to a plurality of castor holders (320A-B) which is mounted to an end of a sliding part of the at least one linear guide (322A) to touch and roll the plurality of castors (318A-D).

4. The mobile robotic manipulator with the telepresence system (100) as claimed in claim 1, wherein a turntable assembly mounting plate (314) is mounted at a certain height from the chassis plate (302) through a plurality of standoffs (308A-N), and wherein a bottom end of a turntable assembly (312) is mounted to a center of the turntable assembly mounting plate (314).

5. The mobile robotic manipulator with the telepresence system (100) as claimed in claim 1, wherein a movable top rod end of the front actuator (204) is mounted to one of a pivot point (202A) from a plurality of pivot points (202A-B) on the bottom plate (528) of the gripper (110).

6. The mobile robotic manipulator with the telepresence system (100) as claimed in claim 1, wherein a movable top rod end of the rear actuator (206) is mounted to one of a pivot point (202B) from the plurality of pivot points (202A-B) on the bottom plate (528) of the gripper (110).

7. The mobile robotic manipulator with the telepresence system (100) as claimed in claim 1, wherein a hook arm (216) is mounted on a top side of the first rotating plate (404) for a curved end of the hook arm (216) to rotate about another pivoted end to a desired angle.

8. The mobile robotic manipulator with the telepresence system (100) as claimed in claim 1, wherein a fixed end of the gripper (110) is mounted to the bottom plate (528) of the gripper (110) and a rod expanding end to a cam pin (504) of the cam plate (502), wherein the cam pin (504) of the cam plate (502) is connected to a rod end of the gripper actuator (506).

9. The mobile robotic manipulator with the telepresence system (100) as claimed in claim 8, wherein actuation of the gripper actuator (506) causes a rotary motion to a gripper housing (534) which is mounted to swivel on top of the top plate (526) of the gripper (110).

10. The mobile robotic manipulator with the telepresence system (100) as claimed in claim 1, wherein one end of a spherical joint (510) is connected to a U plate (530), wherein a gripper rotary motor (524) is mounted on the U plate (530).

11. The mobile robotic manipulator with the telepresence system (100) as claimed in claim 1, wherein a gripper rotary motor (524) rotates the rotary gripper assembly (106) about an axis of the gripper rotary motor (524) of the mobile robotic telepresence system (100).

12. The mobile robotic manipulator with the telepresence system (100) as claimed in claim 1, wherein the rotary gripper assembly (106) comprises a gripper linear motor (522) mounted to a support plate (520) and a screw nut (604) mounted to the gripper linear motor (522).

13. The mobile robotic manipulator with the telepresence system (100) as claimed in claim 12, wherein the screw nut (604) comprises a plurality of ends, wherein the plurality of ends are connected by a single finger clamp (606) and a double finger clamp (602).

14. The mobile robotic manipulator with the telepresence system (100) as claimed in claim 13, wherein the single finger clamp (606) and the double finger clamp (602) are mounted on a clamp holding pin (518), wherein the clamp holding pin (518) is mounted in between flanges of the support plate (520).

15. The mobile robotic manipulator with the telepresence system (100) as claimed in claim 14, wherein the gripper linear motor (522) rotates the single finger clamp (606) and the double finger clamp (602) which is pivoted about the clamp holding pin (518) to open or close as the screw nut (604) moves forward and backward direction by the gripper linear motor (522).

* * * * *